INVENTORS.
William B. Smyth.
Otto J. Winkelmann
BY
Harness and Harris
ATTORNEYS.

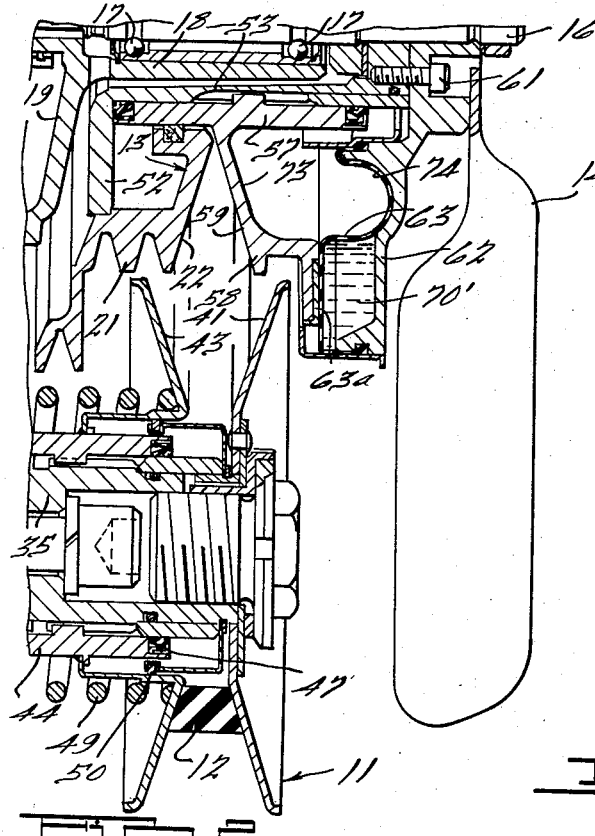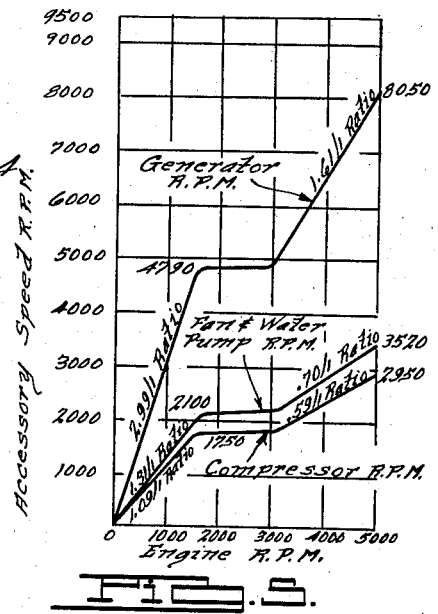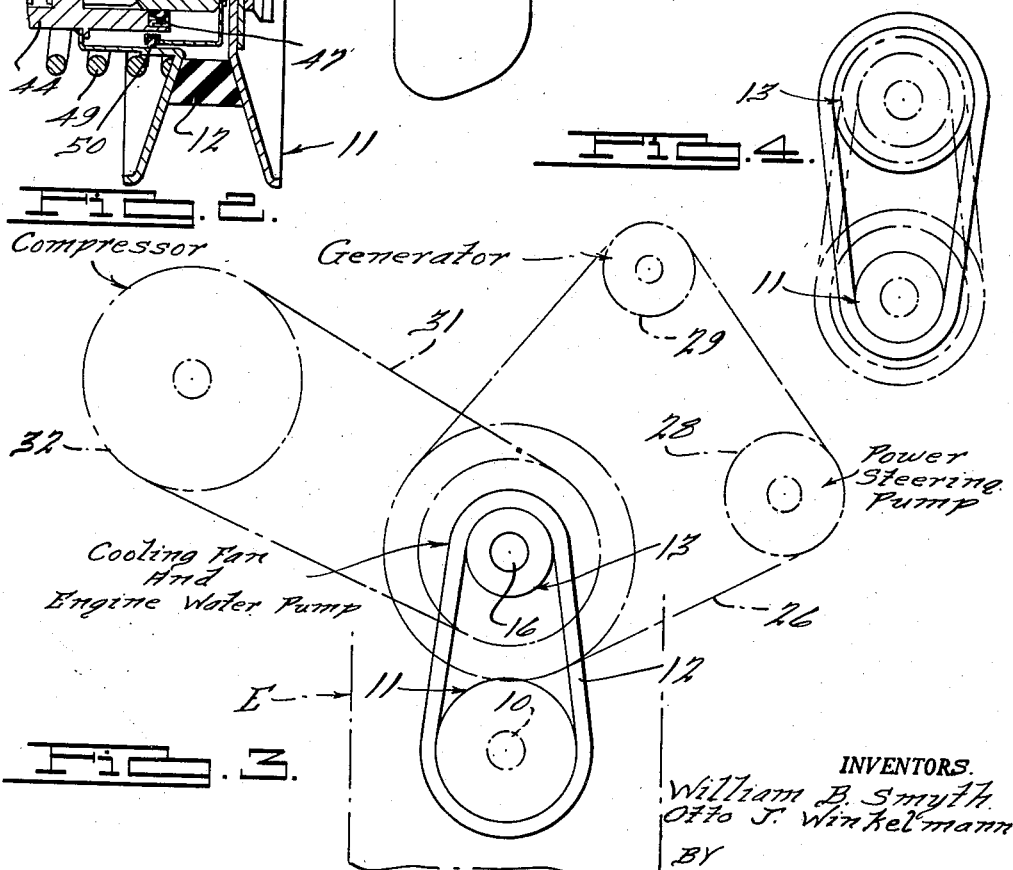

United States Patent Office 2,909,071
Patented Oct. 20, 1959

2,909,071

VARIABLE SPEED ACCESSORY DRIVE

William B. Smyth, Edgewood, Md., and Otto J. Winkelmann, Birmingham, Mich., assignors to Chrysler Corporation, Highland Park, Mich., a corporation of Delaware Application May 23, 1956, Serial No. 586,748

3 Claims. (Cl. 74—230.17)

This invention relates to a variable speed pulley drive and particularly to an engine accessory drive wherein variations in engine speed are used to centrifuge a mass of fluid radially of a flexible walled chamber to cause associated mechanism to effect variation in the pitch of a V-belt pulley drive.

It is a primary object of this invention to provide a simplified form of variable speed accessory drive that can be readily adapted to motor vehicle engines to provide for drive of the engine driven accessories at a plurality of different speeds that vary inversely with respect to the engine speeds.

It is a further object of this invention to provide a variable pitch V-belt pulley drive wherein a fluid mass is arranged to be centrifuged between different positions, due to variations in speeds of a driving shaft, the movement of the fluid mass effecting variation in the pulley drive ratio or effective pitch.

It is still another object of this invention to provide a variable pitch pulley drive wherein the drive ratio changing mechanism comprises a fluid containing closed chamber having a diaphragm type flexible wall portion that is rearrangeable under the centrifugal action of the contained fluid mass due to changes in rotational speed of the chamber, the movement of the fluid mass under centrifugal action being used to operate means that vary the effective pitch of the pulley.

It is still another object of this invention to provide in combination a spring loaded variable pitch drive pulley and a variable pitch driven pulley having a shiftable fluid mass rotatable therewith that opposes the action of the spring loaded drive pulley through the tension in the V-belt connecting the two pulleys.

Other objects and advantages of this invention will be readily apparent from a reading of the following description and a consideration of the related drawings wherein:

Fig. 2 is a fragmentary sectional elevational view of a portion of the structure shown in Fig. 1 but showing the pulley belt shifted to a different pitch position;

Fig. 3 is a diagrammatic sketch of an engine driven accessory drive arrangement that includes the variable pitch pulley belt drive forming this invention;

Fig. 4 is another diagrammatic sketch showing the variable pitch pulley belt in its two limiting positions; and Fig. 5 is a graph that clearly discloses the changes in drive ratio of the several accessories drives that are associated with this variable pitch pulley drive mechanism.

Figure 1:
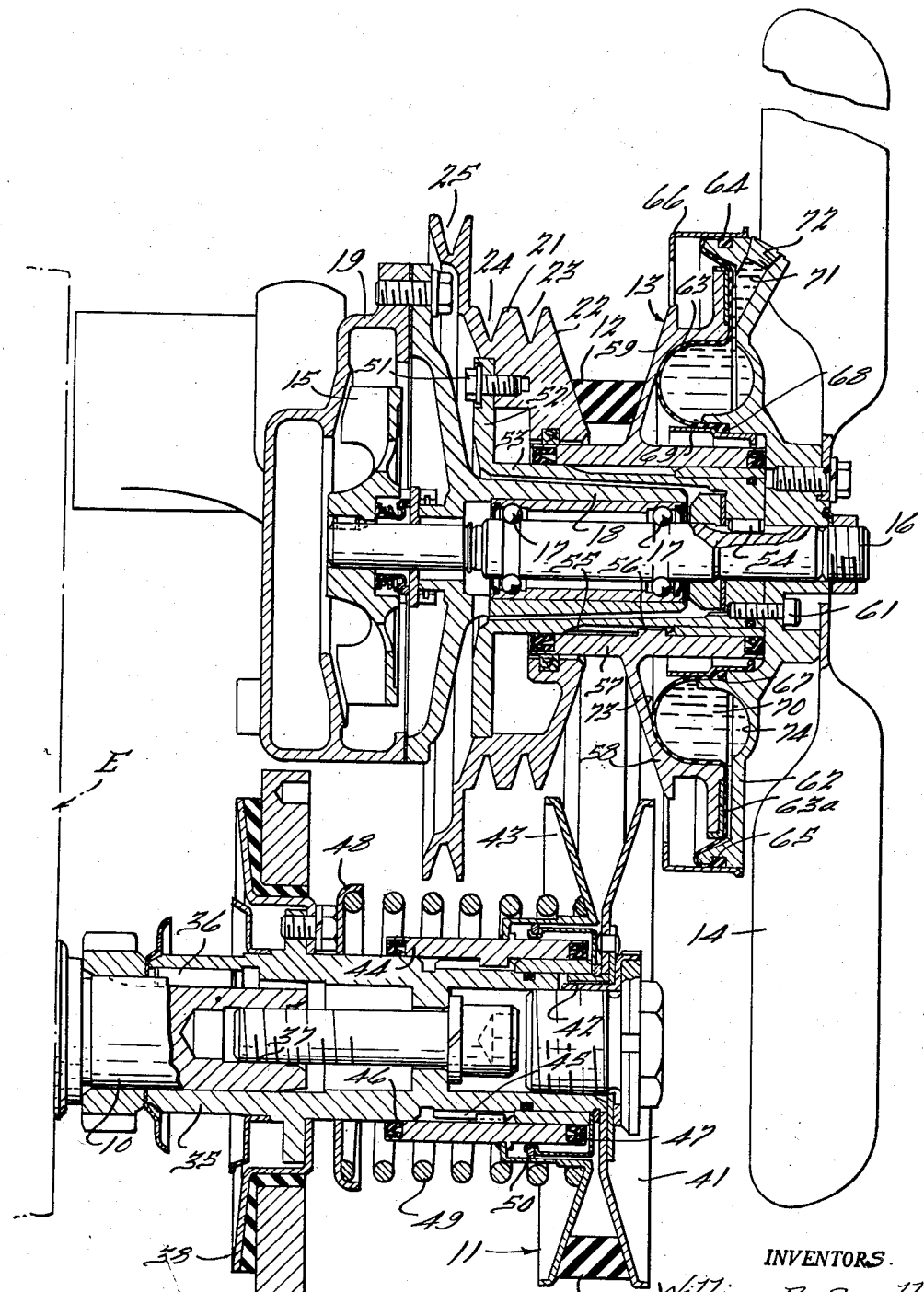
Fig. 1 is a sectional elevational view of a portion of an engine having a variable pitch pulley drive associated therewith that embodies this invention.

Fig. 3 shows diagrammatically a pulley belt accessory drive structure that is utilized on certain types of motor vehicle engines. The numeral 10 is applied to the crankshaft of vehicle engine E. Crankshaft 10 has drivingly connected thereto a variable pitch, V-belt, pulley 11 that is shown in detail in Figs. 1 and 2. Pulley 11 drives an endless V-belt 12 that is drivingly tensioned around another variable pitch, V-belt pulley 13. Pulley 13 is shown in detail in Figs. 1 and 2 and is arranged to directly drive the vehicle engine cooling fan 14 and the engine cooling water pump 15 (see Fig. 1). Fan 14 and pump 15 are each drivingly mounted on the stub shaft 16 that is journalled in bearings 17 seated in the fixed sleeve 18 that forms a part of the engine mounted water pump housing 19. Pulley 13 includes a rotatable, disc-like, body portion 21 that is fixed against axial shift. Body 21 is formed with a coned pulley belt supporting face 22 and three V-shaped pulley belt grooves 23, 24 and 25. Grooves 23 and 24 receive endless V-belts 26 (see Fig. 3) that are drivingly tensioned around the grooved accessory drive pulleys 28 and 29. Pulleys 28 and 29 respectively provide for the drive of a power steering pump and an electrical system generator (not shown). Groove 25 of the pulley 13 receives an endless V-belt 31 that is drivingly mounted in a groove of the pulley 32 that drives a compressor for a vehicle air conditioning system or the like.

From Fig. 1 it will be noted that the engine crankshaft 10 has a sleeve 35 keyed thereto at 36 and bolted thereto at 37. Sleeve 35 drivingly mounts the torsional vibration damper 38 and the variable pitch, V-belt receiving, drive pulley 11. The pulley 11 comprises a coned plate 41 that is drivingly connected to the sleeve 35 at 42. Spaced from the coned plate 41 is a second coned plate 43 arranged in parallelism with the plate 41 so as to provide a V-belt receiving groove between the plates 41, 43. The coned plate 43 is drivingly mounted on a sleeve section 44 that surrounds and is splined to the sleeve 35 as shown at 45. The splined connections 45 are such that the sleeve section 44 and the attached plate 43 may be shifted axially of the sleeve 35. Seals 46, 47, 50 prevent the entry of dirt or other foreign matter into the splined connections 45. Surrounding the sleeve section 44 and extending between the pulley plate 43 and the abutment 48 is a compression spring 49. Spring 49 continuously urges the pulley plate 43 towards the pulley plate 41 so that the V-belt 12, supported between the plates 41, 43, will normally be carried at the largest radius or maximum pitch of pulley 11. It is thought to be obvious that the application of a sufficient force to the belt 12 tending to pull the belt 12 radially inwardly (see Fig. 2) with respect to the axis of plate 41, 43 will cause an axial separation of the shiftable plate 43 with respect to the relatively fixed plate 41 and a corresponding reduction in the effective pitch of pulley 11. Spring 49 is compressed during this axial separation of plates 41, 43 so that it is stressed to urge the plates 41, 43 together wherever the separating force applied to the belt 12 is relieved.

Pulley 13 that is driven by drive pulley 11 through the endless V-belt 12 includes the multiple grooved body portion 21. Body 21 is connected by screws 51 to the flange 52 of a hub sleeve 53. Sleeve 53 is drivingly connected by pins 54 to the rotatable stub shaft 16 that mounts the engine fan 14 and the water pump 15. Sleeve 53 is provided with splineways 55 that slidably receive the teeth 56 that are formed on the hub portion 57 of the shiftable disc 58. Disc 58 has a V-belt receiving face 59 that cooperates with the face 22 of the pulley body portion 21 to provide the V-shaped groove that receives the endless V-belt 12. Due to the fact that the disc 58 is slidably splined to the sleeve 53 it is thought to be obvious that axial movement of the disc 58 will vary the effective radius or pitch of the driven pulley 13 because of the radial movement of the pulley belt 12 along the pulley faces 22, 59.

The means for effecting axial movement of the shiftable disc 58 will now be described. Drivingly connected to the front end of the sleeve 53 by the screws 61 is a second disc 62. Disc 62 has attached to its outer periphery a flexible, fluid retaining diaphragm 63. The outer edge of the diaphragm 63 is enlarged to provide a rib 64 that may be seated in a groove 65 in the periphery of disc 62. A rim 66 encircles the outer periphery of the disc 62 to anchor the outer periphery of the flexible diaphragm 63 to the disc 62 by a leakproof connection. The inner periphery of the diaphragm 63 is enlarged to provide a rib 67 that may be seated in a step 68 formed in the disc 62. A stepped sleeve 69 is pressed into the stepped opening in disc 62 so as to connect the inner periphery of the diaphragm 63 to the disc 62 by a leakproof connection. A stiffening plate 63a is bonded to the outer side of diaphragm 63 and this plate 63a is also crimped to the disc 58.

The connections of the flexible diaphragm 63 to the discs 58 and 62, as shown, insures the formation of one or the other of the closed, ring shaped, chambers 70 or 70' between the discs 58 and 62 depending on the speed of driving pulley 11. Diaphragm 63 provides a flexible side wall portion for the chambers 70 and 70' that may be readily reshaped as the fluid mass is shifted radially by engine speed changes. To provide for the filling of the chamber 70 with a fluid, or the like, the disc 62 is pierced by a bore 71 that is closed by a removable screw plug 72. The discs 58 and 62 are each formed with concave, ring-shaped, formations 73, 74 that are arranged in opposed relationship. These concave formations provide surfaces 73, 74 that cooperate with the flexible, fluid filled diaphragm 63 to normally provide a first fluid filled chamber 70 that is located radially inwardly from the outer periphery of the discs 58, 62. Rotation of the driven pulley 13 by the spring tensioned pulley belt 12 will tend to centrifuge the fluid in chamber 70 radially outwardly and when the speed of pulley 13 is increased to a predetermined value the centrifugal force of the mass of fluid in chamber 70 acting on the ramp or cam surfaces 73, 74 will be sufficient to urge the shiftable disc 58 away from the disc 62 and then the fluid mass in chamber 70 will be centrifuged radially outwardly so that it is relocated in the second or outer chamber 70' (see Fig. 2). Now the effective radius or effective pitch of the pulley 13 is considerably greater than that shown in the Fig. 1 arrangement. The radial shift of the diaphragm contained fluid mass between its two limiting positions 70 and 70' is gradually brought about as the fluid mass is emptied from the chamber 70 and relocated in the chamber 70'. The graphs of Fig. 5 clearly bring out this transition point. The control of the shift point by a fluid mass within a flexible walled container has many advantages over gearing or flywheel weights that have been used for similar purposes in accessory drives.

Fig. 5 shows that at relatively low engine speeds the several accessory pulleys 28, 29, 32 are overdriven whereas after the engine speed has increased to a certain predetermined speed the variable pitch pulley drive herein disclosed operates to effect a drive ratio change that causes underdrive of the accessories at engine speed above the shift speed. This is very important for with present day high speed engines it is often quite a cost penalty and design problem to have to design the accessories to be driven over wide speed ranges and at exceptionally high speeds. Furthermore, at the higher engine and vehicle speeds the requirements of the accessories have usually been reduced considerably so that actually horsepower is being wasted when the accessories are overdriven or directly driven at the higher engine speeds. It is obvious that during high speed driving the air flow due to vehicle movement is high so the cooling fan and water pump do not have to carry the same relative loads as at low engine and vehicle speeds. Likewise, at high engine speeds and consequently high vehicle speeds, steering is much easier than at low vehicle speeds and thus the load on the power steering pump is reduced. Also a cheaper and more efficient compressor for the car air-conditioning system can be used if the speed range of the compressor drive is reduced for the more constant the driving speed the more efficient the compressor.

Operation of the disclosed variable speed pulley drive is as follows: At low engine speeds the centrifugal force acting on the diaphragm contained fluid mass in the pulley 13 is relatively small and the tendency of this mass to be centrifuged radially outwardly is opposed by the spring 49 of drive pulley 11. Spring 49 is thus able to urge the drive pulley plate 43 to its extreme rightward position when the speed of the engine driven pulley 11 is relatively low. At this time the spring 49 wedges the pulley belt 12 to its outer or maximum radius on the variable pitch driving pulley 11, as shown in Fig. 1. With belt 12 on the maximum radius of pulley 11, it must be on the minimum radius of the driven pulley 13 and the fluid mass enclosed by the diaphragm 63 of pulley 13 will be positioned in the annular chamber 70 as shown in Fig. 1. Accordingly, at this time the accessories will be overdriven for the driving pulley 11 is operating on its maximum radius or pitch while the driven pulley 13 is operating on its minimum radius or pitch. As the engine speed increases a speed is reached where the centrifugal force of the rotating fluid mass within the diaphragm 63 of pulley 13 overcomes the belt transmitted opposing force of the spring 49 and then the fluid mass in chamber 70 (Fig. 1) is centrifuged radially outwardly to a new position such as that indicated by the numeral 70' in Fig. 2. Spring 49 will be compressed as the fluid mass is moved radially outwardly to its chamber 70' position and at the same time the axially shiftable disc 58 will be moved to the left towards the pulley element 21. Movement of the shiftable disc 58 to the left wedges the endless belt 12 radially outwardly along the belt faces 22, 59 of pulley 13 and at the same time pulls the endless belt 12 radially inwardly along the faces 41, 43 of the pulley 11 and compresses spring 49 of pulley 11. The pulley drive ratio is thus changed from the starting overdrive ratio to an underdrive ratio that is particularly advantageous for high engine speed driving. The underdrive obviously results from the fact that the driving pulley 11 is now operating on a minimum pitch or radius whereas the driven pulley 13 is operating on its maximum effective radius or pitch.

The pulley design herein disclosed is one that is inexpensive, simple, and readily incorporated in existing engine driven accessory drives without requiring any major alteration of existing engine parts. Expensive gear trains and/or slip clutches and controls therefore are not required. Assembly and disassembly of the unit can be quickly and easily accomplished. In the event the diaphragm 63 should leak or fail still a positive drive will be retained for the pulley belt 12 will merely remain in its overdrive position. Because a flexible walled container is used for the shiftable fluid mass, no expensive ramp surfaces or the like are required and furthermore the ability to control the points of drive ratio change is improved. Variation in the shape of the disc face cavities 73, 74 will permit control of the type of drive ratio change that can be achieved. Thus in addition to economy, reliability and simplicity this accessory drive gives exceptional flexibility to meet varying conditions.

We claim:

1. A variable pitch pulley for a V-belt drive comprising a first rotatable disc having a coned, radially extending, belt receiving face thereon, a second disc with a coned, radially extending, belt receiving face thereon positioned with respect to the belt face on said first disc so that said faces can drivingly receive therebetween a V-belt, said second disc being drivingly connected to said first disc and having a radially extending ramp surface on the side opposite its belt receiving face, said second disc being shiftable axially relative to said first disc, a third radially extending disc drivingly connected to said first disc and arranged axially adjacent said axially shiftable second disc and having a radially extending ramp surface thereon facing the ramp surface on said second disc, said two facing ramp surfaces normally cooperating at relatively low pulley speeds to provide therebetween a first relatively large volume annular chamber located closely adjacent the axis of rotation of the discs, a radially extending, flexible diaphragm mounted between and having portions engaged with adjacent portions of said second and third discs to provide with said ramp surfaces, at relatively low pulley speeds, a unitary, closed, fluid retaining compartment located in said first chamber between the second and third discs, said diaphragm having flexible wall portions extending radially of and engageable with the ramp surfaces of the second and third discs and rearrangeable, at relatively high pulley speeds, when the fluid mass in said compartment is centrifuged radially outwardly along the ramp surfaces to provide a second relatively large volume annular chamber between said second and third discs spaced radially outwardly from the axis of rotation of said discs such that fluid mass containing portions of the diaphragm in each of said chambers engage and rest against different portions of the radially extending ramp surfaces to apply variable, axially directed, forces to said axially shiftable second disc to effect variation in the axial separation of the first and second discs.

2. A variable pitch pulley for a V-belt drive comprising a first rotatable disc having a coned, radially extending, belt receiving face thereon, a second disc with a coned, radially extending, belt receiving face thereon positioned with respect to the belt face on said first disc so that said faces can drivingly receive therebetween a V-belt, said second disc being drivingly connected to said first disc and having a radially extending ramp surface on the side opposite its belt receiving face, said second disc being shiftable axially relative to said first disc, a third radially extending disc drivingly connected to said first disc and arranged axially adjacent said axially shiftable second disc and having a radially extending ramp surface thereon facing the ramp surface on said second disc, said two facing ramp surfaces defining an annular cavity adjacent the disc axes and having flat sided opposed portions radially outwardly of the cavity with said ramp surfaces normally cooperating at relatively low pulley speeds to provide therebetween a first relatively large volume chamber located closely adjacent the axis of rotation of the discs, a radially extending, flexible diaphragm mounted between and having portions engaged with adjacent portions of said second and third discs to provide with said ramp surfaces, at relatively low pulley speeds, a unitary, closed, fluid retaining toroidal compartment located in said first chamber between the second and third discs, said diaphragm having flexible wall portions extending radially of, and engageable with the ramp surfaces of the second and third discs and being rearrangeable, at relatively high pulley speeds, when the fluid mass in said compartment is centrifuged radially outwardly along the ramp surfaces to provide a second relatively large, flat sided, annular chamber between said second and third discs spaced radially outwardly from the axis of rotation of said discs such that fluid mass containing portions of the diaphragm in each chamber engage and rest against the radially extending ramp surfaces to apply variable, axially directed, forces to said axially shiftable second disc to effect variation in the axial separation of the first and second discs.

3. A variable pitch pulley as set forth in claim 1 including a second variable pitch pulley laterally spaced from said first pulley and comprising fourth and fifth rotatable members each of which includes a belt receiving face, the pair of faces of said fourth and fifth members being arranged to provide a groove that drivingly receives a V-belt, said fourth and fifth members being drivingly connected for rotation and arranged for relative axial movement, resilient means opposing relative axial movement between said fourth and fifth members, and an endless V-belt drivingly connected between the grooves of the first and second pulleys.

References Cited in the file of this patent

UNITED STATES PATENTS

| | | |
|---|---|---|
| 1,618,644 | Dickson | Feb. 22, 1927 |
| 2,288,114 | Smith | June 30, 1942 |
| 2,553,505 | Miner | May 15, 1951 |
| 2,556,512 | Ammon | June 12, 1951 |
| 2,651,210 | Clark | Sept. 8, 1953 |
| 2,757,522 | Peterson | Aug. 7, 1956 |
| 2,802,367 | Hoover | Aug. 13, 1957 |